United States Patent
Pinter

(10) Patent No.: US 10,663,624 B2
(45) Date of Patent: May 26, 2020

(54) METHOD FOR CREATING A NANOSTRUCTURE IN A TRANSPARENT SUBSTRATE

(71) Applicant: Robert Bosch GmbH, Stuttgart (DE)

(72) Inventor: Stefan Pinter, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 596 days.

(21) Appl. No.: 15/318,741

(22) PCT Filed: May 29, 2015

(86) PCT No.: PCT/EP2015/061972
§ 371 (c)(1),
(2) Date: Dec. 14, 2016

(87) PCT Pub. No.: WO2015/193082
PCT Pub. Date: Dec. 23, 2015

(65) Prior Publication Data
US 2017/0131437 A1    May 11, 2017

(30) Foreign Application Priority Data
Jun. 18, 2014   (DE) .......... 10 2014 211 753

(51) Int. Cl.
*G02B 1/118*   (2015.01)
*H01L 21/302*  (2006.01)
*G02B 1/113*   (2015.01)

(52) U.S. Cl.
CPC .............. *G02B 1/118* (2013.01); *G02B 1/113* (2013.01)

(58) Field of Classification Search
None
See application file for complete search history.

(56) References Cited

U.S. PATENT DOCUMENTS

| | | | |
|---|---|---|---|
| 2008/0166878 A1* | 7/2008 | Li | B81C 1/00111 438/704 |
| 2010/0117108 A1* | 5/2010 | Gaebler | B82Y 20/00 257/98 |
| 2010/0155786 A1* | 6/2010 | Heald | G03F 7/0754 257/213 |
| 2012/0147303 A1 | 6/2012 | Yamada et al. | |

FOREIGN PATENT DOCUMENTS

| | | |
|---|---|---|
| CN | 102033255 A | 4/2011 |
| EP | 2241909 A2 | 10/2010 |
| KR | 20140061901 A | 5/2014 |
| WO | 2008037506 A1 | 4/2008 |

OTHER PUBLICATIONS

International Search Report dated Aug. 31, 2015, of the corresponding International Application PCT/EP2015/061972 filed May 29, 2015.

* cited by examiner

*Primary Examiner* — Shamim Ahmed
(74) *Attorney, Agent, or Firm* — Norton Rose Fulbright US LLP; Gerard Messina

(57) ABSTRACT

A method for creating a nanostructure in a transparent substrate, including a) applying a first structure carrier layer having a defined thickness onto at least one surface of the substrate; b) forming a nanostructure in the first structure carrier layer; and c) oxidizing the first structure carrier layer.

12 Claims, 5 Drawing Sheets

METHOD FOR CREATING A NANOSTRUCTURE IN A TRANSPARENT SUBSTRATE

FIELD

The present invention relates to a method for creating a nanostructure in a transparent substrate. The present invention furthermore relates to a nanostructure in a transparent substrate.

BACKGROUND INFORMATION

Antireflection coatings are used to suppress or reduce optical reflections on optical surfaces, such as lenses, objectives, prisms, plates, and the like, and to increase the transmittance. A reduction in the degree of reflection on the coated surface may be achieved by a destructive interference of the reflected beams. For this purpose, an antireflection layer is applied to the described optical surfaces.

An alternative approach for reducing reflections on optical surfaces is nanostructures on the object surface. Geometric dimensions and distances between such structures must be smaller in this case than the wavelength of the incident optical radiation. Geometric shapes that effectuate an essentially continuously varying refractive index, such as acute-angled frustums, are suitable nanostructures. A smooth transition of the refractive index reduces the degree of reflection without great wavelength and angle dependency. With optimized structure geometries, a reflex reduction which is independent from the polarization is also possible. An antireflection effect due to nanostructures formed on the surface is referred to as the so-called "moth eye effect."

German Patent Application No. DE 10 2007 014 538 A1 describes a method which allows moth eye structures to be generated directly on fused silica with the aid of etching.

SUMMARY

It is an object of the present invention to provide an improved method for applying an antireflection coating to optical surfaces.

According to a first aspect, the object is achieved by a method for creating a nanostructure in a transparent substrate, including the following steps:
a) applying a first structure carrier layer having a defined thickness to at least one surface of the substrate;
b) forming a nanostructure in the first structure carrier layer; and
c) oxidizing the first structure carrier layer.

According to the present invention, the nanostructure is initially formed in a first structure carrier layer, which is subsequently completely oxidized in an oxidation process, and thereby converted into a transparent material. As a result, a nanostructure formed integrally with the transparent substrate is provided. Advantageously, it is more easily possible to form the nanostructure in the structure carrier layer than in the transparent substrate; in particular, generally improved handling and simplified exposure processes are supported in this way.

Advantageous refinements of the method are described herein.

One advantageous refinement of the method provides for elements of the nanostructure to have a pyramidal design. In this way, a nanostructure is created with the aid of which an essentially continuously varying refractive index from air to glass, and thus a moth eye structure, is implemented.

One advantageous refinement of the method provides for defined flank angles to be formed in the pyramidal elements of the nanostructure. This may be achieved in a simple manner by undercutting or overetching processes of the first structure carrier layer. In this way, shaping of the pyramidal elements may be efficiently influenced, and a creative leeway may advantageously be significantly enhanced.

One further advantageous specific embodiment of the method provides for the forming of the nanostructure in the first structure carrier layer to be carried out on both surfaces of the transparent substrate. This takes advantage of the circumstance that the first structure carrier layer is present on both sides of the transparent substrate, whereby ultimately the nanostructures may be formed in both surfaces of the transparent substrate.

One further advantageous specific embodiment of the method provides for a protective layer to be applied at least partially onto the nanostructure of the first structure carrier layer. In this way, it is possible to protect defined areas of the transparent substrate against further processing. Moreover, optically transparent and optically non-transparent areas may be generated in the transparent substrate with the aid of the protective layer.

One advantageous refinement of the method provides for the protective layer not to be applied in the area of the nanostructure. This supports the nanostructure being formed in a recessed manner compared to the surface of the first structure carrier layer, whereby further processing of the transparent substrate including the sensitive nanostructure is simplified.

One advantageous refinement of the method provides for nitride to be used as the protective layer. In this way, a technical implementation option is provided for defining transparent and non-transparent areas. In the non-transparent coated areas, an oxidation is not provided, or an oxidation progresses considerably more slowly.

One advantageous refinement of the method provides for an intermediate layer of a transparent substrate to be applied to the first structure carrier layer, a second structure carrier layer being applied to the intermediate layer, the second structure carrier layer and the intermediate layer being at least partially removed, and nanostructures being formed in the first structure carrier layer. Thereafter, the exposed first structure carrier layer is oxidized. In this way, the second structure carrier layer and the intermediate layer assume the protection of the structures and enable a structuring on the other side of the transparent substrate or optically non-transparent areas within the transparent substrate.

One advantageous refinement of the method provides for polysilicon to be used for the structure carrier layers. In this way, a cost-effective and proven material from the semiconductor technology is used, with which a defined structuring of the nanostructures using a lithography technique is easily possible.

One further specific embodiment of the method provides for $SiO_2$ to be used as transparent substrate material. In this way, a cost-effective optically transparent substrate base material is provided, in which the nanostructures are formed and in this way effectuate an antireflection effect.

The present invention is described in greater detail hereafter with further features and advantages based on several figures. All features, regardless of their representation in the description and in the figures, form the subject matter of the present invention. The figures are not necessarily implemented in a manner true to scale and serve in particular for the clarification of the principles according to the present invention.

DETAILED DESCRIPTION OF EXAMPLE EMBODIMENTS

Figure 1:
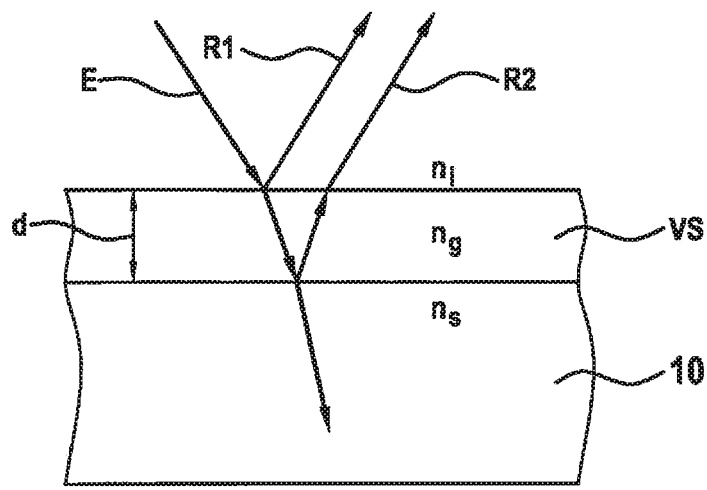
FIG. 1 shows a conventional layer system for generating destructive interference on an optical surface.
Figure 2A:
FIG. 2 shows a schematic mode of operation of a first specific embodiment of a method for creating a nanostructure.
Figure 2B:
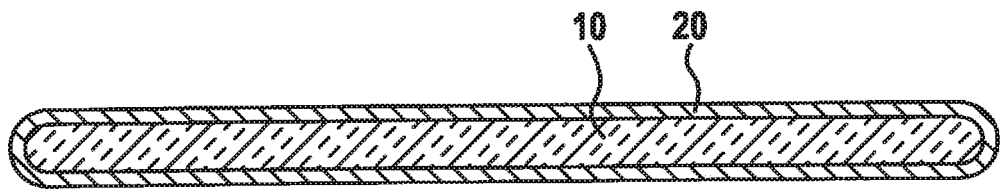
Figure 2C:
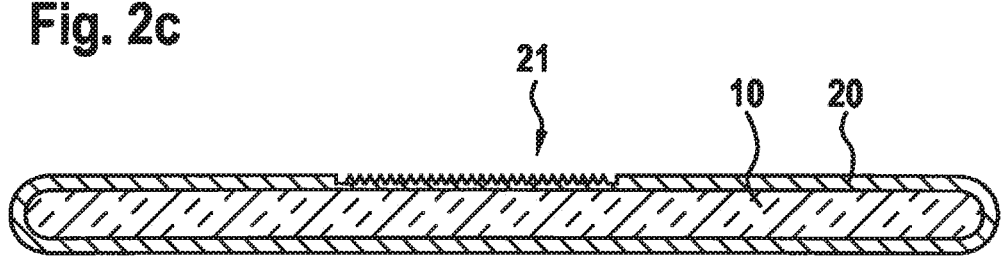
Figure 2D:
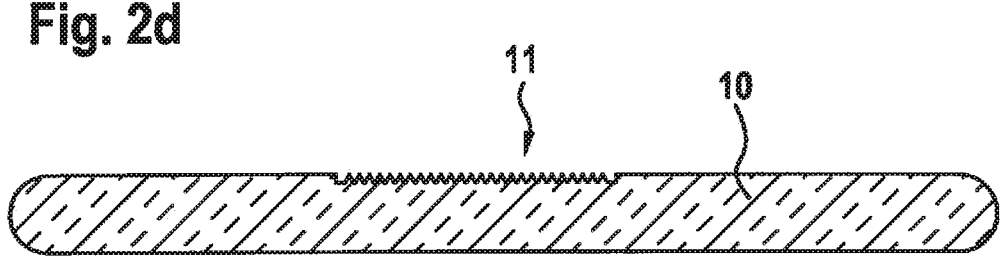

FIG. 1 shows a schematic mode of operation of a conventional antireflection layer on a transparent substrate 10 (e.g., glass) with the aid of destructive interference. An incident beam E having a wavelength λ is partially reflected on the surface including an antireflection layer VS having a thickness d into a reflected beam R1. $n_i$, $n_g$ and $n_s$ denote the refractive index of the air, the refractive index of the antireflection layer VS and the refractive index of the substrate. The non-reflected portion of the beam E passes through the antireflection layer VS and is partially reflected on an interface between the antireflection layer VS and the substrate 10 into a beam R2. The two reflected subbeams R1 and R2 may interfere completely destructively at a phase difference of π if their amplitudes are identical. The reflection may also be reduced for a wide wavelength and angular range by the use of multiple layers having differing refractive indices.

FIG. 2 basically shows a mode of operation of a creation process according to the present invention for a nanostructure in or on a transparent substrate 10. A fused silica wafer may preferably be used as transparent substrate 10. In a low pressure chemical vapor deposition (LPCVD process), a first structure carrier layer 20 is deposited in the form of polysilicon simultaneously on both wafer sides of the fused silica wafer with the aid of epitaxial deposition. A thickness of the deposited first structure carrier layer is very easily controllable in terms of the process technology, whereby a defined dimensioned first structure carrier layer 20 may be formed. After the deposition of the polysilicon, the fused silica wafer is optically no longer transparent and may thus be further processed on conventional equipment of a semiconductor microchip factory.

After a coating process, an exposure is carried out with the aid of an exposure system (not shown), whose light source allows submicrometer structures or nanostructures 21 to be represented in the polysilicon. After the development of the photoresist, the structuring is preferably carried out with the aid of reactive ion etching (trenching) of the polysilicon. The etching process advantageously allows the etching flanks of nanostructure 21 to be freely designed to a large extent by selecting deliberate parameters, it being possible to form positive or negative etching flank angles of pyramidal elements or substructures of nanostructure 21.

As a result, for example pyramidal elements of nanostructure 21 having very precisely dimensionable or reproducible flank angles are thus obtained, which were achieved by overetching or undercutting. A height of nanostructures 21 may be defined by a defined thickness of the polysilicon. Dimensions of elements of nanostructure 21 are at an order of magnitude below the wavelength of the light for which the structures are intended. The lateral structural shape of nanostructure 21 is defined via the layout, and the vertical structural shape is defined by the process control. If needed, the second substrate side of fused silica wafer 10 may also be structured as described above (not shown).

Following the structuring and removal of the photoresist, the oxidation of the polysilicon into optically transparent $SiO_2$ is carried out under an oxidizing atmosphere in an annealing process. As a result, a nanostructure 11 is thus present in the transparent glass material, which is very easy to dimension and which, as is described hereafter, may be subjected to further optional processing steps.

Figure 3A:
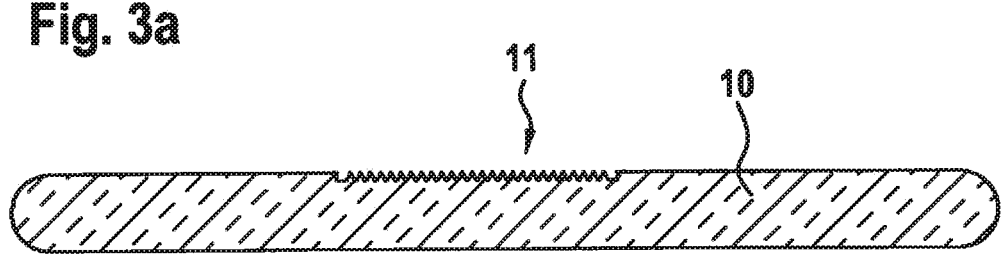
FIG. 3 shows a schematic mode of operation of one refinement of a method for creating a nanostructure.
Figure 3B:
Figure 3C:
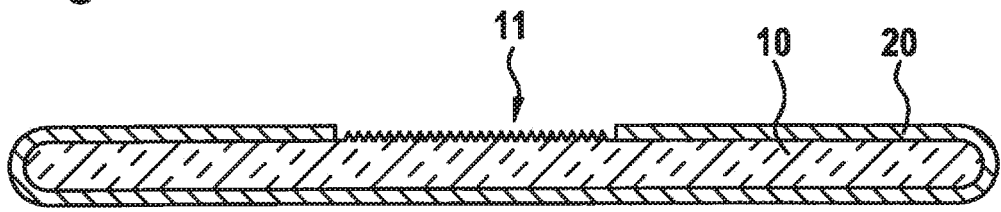

FIG. 3 basically shows that a first structure carrier layer 20 in the form of a polysilicon layer may be applied to optically transparent substrate 10 having nanostructure 11. In a further processing step shown in FIG. 3b, this polysilicon is locally etched away in the area of nanostructure 11 (e.g., with the aid of a protective mask), whereby a partial etching with removal of the polysilicon in the area of nanostructure 11 is possible. As a result, a nanostructure 11 which is "recessed" below the highest level of first polysilicon layer 20 may thus be formed, as shown in FIG. 3c, which allows the entire wafer to be turned over and then processed on the second side, without damaging sensitive nanostructures 11.

This may be of particular interest for the further processing of the wafers having the nanostructures, since in this way the filigree nanostructures may be protected against mechanical contact and damage.

Figure 4A:
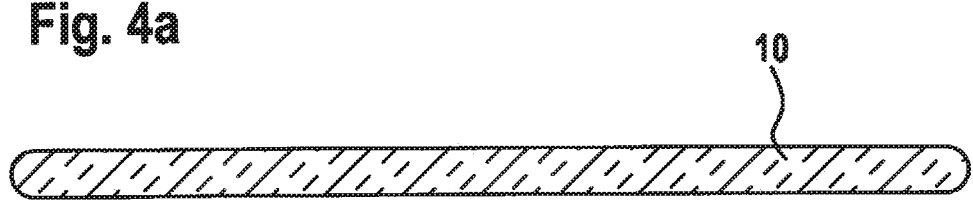
FIG. 4 shows a schematic mode of operation of one refinement of a method for creating a nanostructure.
Figure 4B:
Figure 4C:
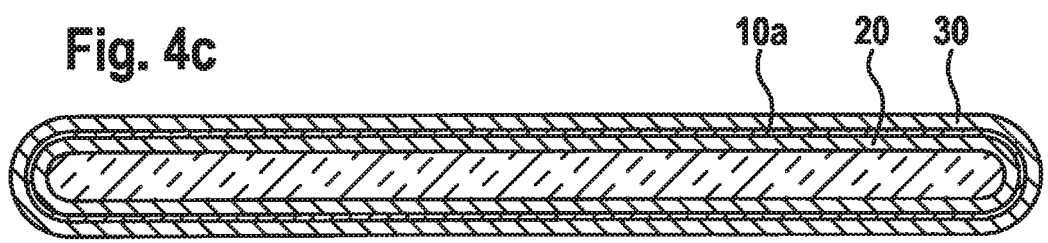

In one alternative of the method indicated in FIG. 4, it is also possible to deposit an intermediate layer 10a including $SiO_2$ material onto first polysilicon layer 20, and a second polysilicon layer 30 thereon (see FIG. 4c).

Figure 4D:
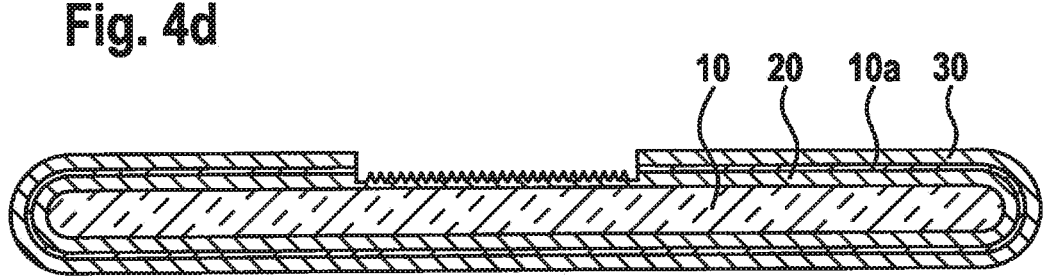
Figure 4E:
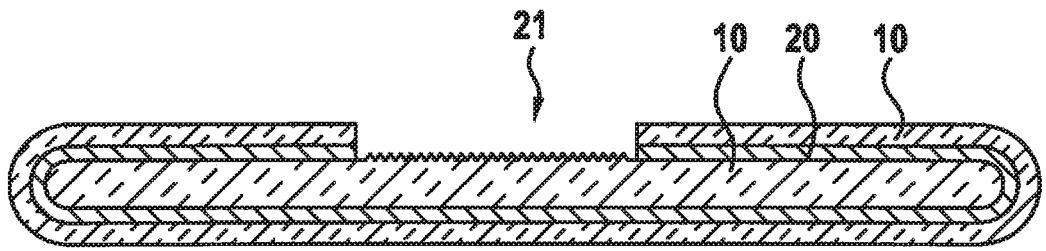

Thereafter, as is apparent from FIG. 4d, a local removal of second polysilicon layer 30 and of intermediate layer 10a by etching down to first polysilicon layer 20 for the purpose of a structuring of first polysilicon layer 20 is carried out. It is apparent from FIG. 4e that exposed first polysilicon layer 20 and second polysilicon layer 30 may be completely oxidized with the aid of an oxidation process, whereby ultimately a structure is formed which is only still transparent in the area of nanostructure 21.

It is apparent that a plurality of variations is possible with the creation method according to the present invention. It is possible to use in particular multiple different thick polysilicon layers with and without oxide as the intermediate layer. Furthermore, the structuring may take place on one side or both sides. For example, it is thus possible to achieve that the polysilicon is etched away from the entire surface on the one wafer side prior to the oxidation.

By depositing and, if necessary, structuring nitride, it is advantageously possible to considerably slow down the oxidation of the polysilicon layer in a locally limited manner. In this way, it is possible to generate optically transparent areas including SiO2, and optically not transparent areas including polysilicon, on one wafer.

For further processing, it is thus advantageously possible to achieve that areas on the wafer edge and adjustment marks are implemented in an optically not transparent manner, for further levels or for enabling automatic handling in plants.

Figure 5:
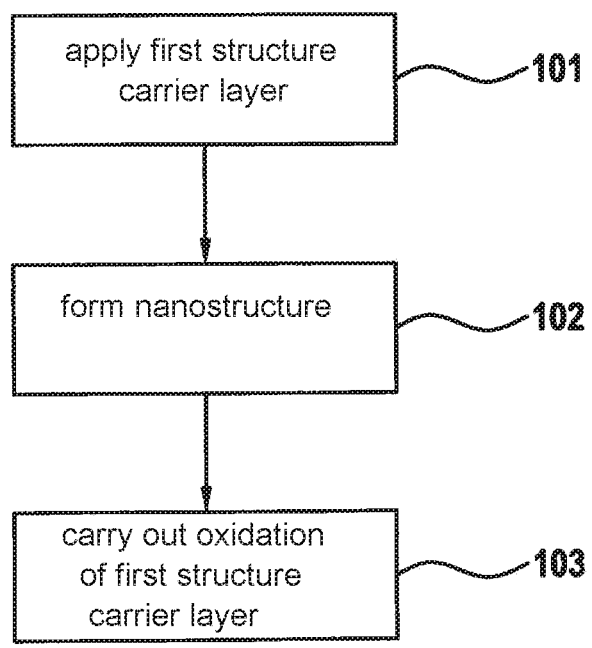
FIG. 5 shows a schematic sequence of one specific embodiment of the method according to the present invention.

FIG. 5 basically shows a sequence of one specific embodiment of the method according to the present invention for creating a nanostructure 11 in a transparent substrate 10.

In a step 101, a first structure carrier layer 20 having a defined thickness is applied to at least one surface of substrate 10.

In a step 102, a nanostructure 21 is formed in first structure carrier layer 20.

Finally, in a step 103, an oxidation of first structure carrier layer 20 is carried out.

In summary, the present invention provides a method for creating nanostructures on an optically transparent glass wafer, which utilizes conventional methods and devices and thus makes it possible in a cost-effective manner to form defined structures in the polysilicon, which are subsequently converted into transparent glass material with the aid of oxidation. This may yield process- and design-related advantages compared to conventional methods, and may preferably be used to generate moth eye structures. The finished nanostructures may be used for optical windows in micromirrors, for example.

Advantageously, the structuring is carried out using established, cost-effective deposition, masking and etching techniques which are suitable for series production and for polysilicon, such as in the form of trenching. Investments in separate equipment for a structuring of glass are advantageously not required.

The geometry of the nanostructures, which are preferably designed as acute-angled frustums, may be controlled well and varied via the process parameters of the reactive ion etching. The height of the nanostructures may be set very precisely with the aid of the deposited layer thickness of the polysilicon. During the structuring using trenching, the etching stops on the silica substrate since the etching rates for silicon and for fused silica differ very greatly from one another. The result is an essentially uniform height of the nanostructure.

For the deposition of the polysilicon layer, it is possible to use equipment which is usually already present in the semiconductor industry, for example LPCVD machines.

Automatic handling of glass wafers on conventional equipment of the semiconductor industry is possible only in exceptional cases due to their optical transparency. Following the deposition of the polysilicon layer, it is not possible to visually distinguish the glass wafers from silicon wafers, whereby their processing on both sides is made possible on all known equipment.

Although the present invention has been described above based on specific exemplary embodiments, it is in no way limited thereto. Those skilled in the art will be able to suitably modify the described features or combine them with each other, without departing from the present invention.

What is claimed is:

1. A method for creating a nanostructure in a transparent substrate, the method comprising:
    a) applying a first structure carrier layer having a defined thickness to at least one surface of the substrate, which is a fused silica wafer;
    b) depositing, via a low pressure chemical vapor deposition (LPCVD), a polysilicon simultaneously on both wafer sides of the fused silica wafer with the aid of epitaxial deposition in the first structure carrier layer, wherein after the deposition of the polysilicon, the fused silica wafer is no longer transparent optically, so that it process-able on semiconductor equipment, and forming a nanostructure in the first structure carrier layer; and
    c) oxidizing the first structure carrier layer under an oxidizing atmosphere in an annealing process, so as to convert it into a transparent material.

2. The method as recited in claim 1, wherein the nanostructure has pyramidal elements.

3. The method as recited in claim 2, wherein defined flank angles are formed in the pyramidal elements of the nanostructure.

4. The method as recited claim 1, wherein a protective layer is applied at least partially to the nanostructure of the first structure carrier layer.

5. The method as recited in claim 4, wherein the protective layer is not applied in the area of the nanostructure.

6. The method as recited in claim 4, wherein nitride is used as the protective layer.

7. The method as recited in claim 1, wherein an intermediate layer of the transparent substrate is applied to the first structure carrier layer, a second structure carrier layer being applied to the intermediate layer of the transparent substrate, the second structure carrier layer and the intermediate layer being at least partially removed, nanostructure being formed in the first structure carrier layer, and the exposed first structure carrier layer being oxidized.

8. The method as recited in claim 7, wherein polysilicon is used for the structure carrier layers.

9. The method as recited in claim 1, wherein $SiO_2$ is used as an intermediate layer of the transparent substrate.

10. The method as recited in claim 1, wherein the nanostructure is formed by an exposure, which is carried out, so as to allow submicrometer structures or nanostructure to be represented in the polysilicon, wherein after development of a photoresist, the structuring is carried out with the aid of reactive ion etching or trenching of the polysilicon, and wherein the etching process allows formation of positive or negative etching flank angles of pyramidal elements or substructures of the nanostructure.

11. The method as recited in claim 1, wherein a height of the nanostructures is defined by a defined thickness of the polysilicon, and wherein dimensions of elements of nanostructure are at an order of magnitude below a wavelength of the light for which the structures are intended.

12. The method as recited in claim 1, wherein the polysilicon is locally etched away in an area of the nanostructure with the aid of a protective mask, so that there is a partial etching with removal of the polysilicon in the area of nanostructure, so that the nanostructure is recessed below a highest level of a first polysilicon layer, which allows the wafer to be turned over and then processed on a second side, without damaging a nanostructure.

* * * * *